United States Patent

Huber

[15] 3,675,942

[45] July 11, 1972

[54] COLLISION SURVIVAL SYSTEM

[72] Inventor: John F. Huber, Litchfield Park, Ariz.

[73] Assignee: Unidynamics/Phoenix, Inc.

[22] Filed: Aug. 31, 1970

[21] Appl. No.: 68,353

[52] U.S. Cl................................280/150 AB, 141/100, 141/10, 180/90

[51] Int. Cl........................................................B60r 21/06

[58] Field of Search..............................280/150 AB; 244/31–33, 121, 122; 116/124.9; 52/2; 137/525.3; 180/90

[56] References Cited

UNITED STATES PATENTS

| | | | |
|---|---|---|---|
| 2,418,798 | 4/1947 | Whitmer | 244/121 |
| 1,370,178 | 3/1921 | Albert | 137/525.3 |
| 3,279,419 | 10/1966 | Demarco | 116/124.9 |
| 3,243,822 | 5/1966 | Lipkin | 280/150 |
| 3,338,001 | 8/1967 | Fraser | 52/2 |
| 3,582,107 | 6/1971 | Goetz | 280/150 |

*Primary Examiner*—Kenneth H. Betts
*Attorney*—Drummond, Cahill & Phillips

[57] ABSTRACT

A restraining device is described incorporating an inflatable bag positioned in a vehicle to restrain persons in a vehicle and prevent them from colliding with objects when the vehicle is subjected to collision accelerations. The bag incorporates passageways therein which are connected to a gas source; the gas source, when actuated, inflates the passageways, thus extending the bag and drawing air into the bag from the atmosphere within the vehicle. A unidirectional valve permits the air to enter the bag, but prevents its escape in the event the pressure within the bag exceeds that of the atmosphere within the vehicle, such as by the impact of a person with the bag.

2 Claims, 4 Drawing Figures

PATENTED JUL 11 1972　　3,675,942

INVENTOR.
JOHN F. HUBER
BY
Drummond Cahill & Phillips
ATTORNEYS

PATENTED JUL 11 1972 3,675,942
SHEET 2 OF 2

INVENTOR.
JOHN F. HUBER
BY
Drummond Cahill & Phillips
ATTORNEYS

COLLISION SURVIVAL SYSTEM

The present invention pertains to collision survival systems, and more particularly, to a human restraining system to prevent persons in a vehicle from colliding with objects within the vehicle at the time of a collision.

Numerous devices have been suggested in the prior art to avoid collision between a person in a vehicle and parts of the vehicle as a result of a collision. These devices include a variety of restraining systems intended to keep the individual in a relatively fixed position in relation to the interior of the vehicle. Inflatable bags have been described wherein the deflated bag is strategically positioned such that, when inflated, the bag presents a soft cushion to receive and absorb the energy of a person being displaced as a result of a vehicular collision.

Inflatable bag systems are presented with numerous technical difficulties which greatly detract from their desirability. In order for the bag to be effective, it must assume a certain minimum volume in a very short period of time, thus requiring the storage of gas in sufficient quantity and under sufficient pressure to fill the bag to the minimum volume. The bag must also be inflated in a minimum time in order for the bag to effectively intercept the motion of an individual and prevent this injury. The minimum volume coupled with the minimum time period further complicates the system. Also, the system must be capable of being strategically placed in the vehicle without the addition of substantial weight and without excessive bulk. To enable the storage of sufficient quantities of gas to inflate the bag which has been acceptably placed and is acceptably small in deflated bulk to the minimum volume in the minimum time period, the requirement for gas storage becomes critical.

A factor which greatly affects the ability of an inflatable system to cope with the minimum design criteria is the rising atmospheric pressure within the vehicle as the inflatable bag expands. The total volume of the fully expanded bag represents a sizable proportion of the total volume in the vehicle; in view of the necessity for rapidly expanding the bag, the atmospheric pressure within the vehicle increases as the bag rapidly expands. This increasing atmospheric pressure compounds the previously described problems in that the stored gas must provide an even greater pressure to fill the bag as the bag expands.

It is therefore an object of the present invention to provide a collision survival system incorporating an inflatable bag.

It is another object of the present invention to provide a collision survival system incorporating an inflatable bag that greatly reduces the required gas storage for inflation.

It is still another object of the present invention to provide a collision survival system incorporating an inflatable bag wherein the atmosphere within the vehicle is utilized to fill the bag, thereby reducing the effects of increased atmospheric pressure as the bag expands.

It is still a further object of the present invention to provide a collision survival system incorporating an inflatable bag wherein the bag utilizes passageways therein connected to a gas source which, when activated, inflates the passageways and extends the bag, resulting in the ingestion of the internal atmosphere of the vehicle.

These and other objects of the present invention will become apparent to those skilled in the art as the description thereof proceeds.

Briefly, in accordance with the embodiment chosen for illustration, a collision survival system incorporating an inflatable bag as a restraining device is provided and may be positioned within the vehicle in any convenient or well known manner. The inflatable bag includes a flexible skin comprising a pair of separated sheets providing a passageway therebetween. A gas source is connected to the passageway and is activated through the detection of predetermined conditions such as accelerations of a magnitude indicating a collision. The gas entering the passageways causes the extension of the bag; the interior of the bag communicates with the atmosphere within the vehicle through a unidirectional valve that permits air to enter the interior of the bag but prevents its escape. As the bag extends, air from the interior of the vehicle is admitted to the now lower pressure at the interior of the bag, resulting in the inflation of the bag. The air in the interior of the bag is prevented from escaping by the unidirectional valve and thereafter acts as a restraining device in a manner well known.

The present invention may more readily be described by reference to the accompanying drawings, in which.

Figure 1:
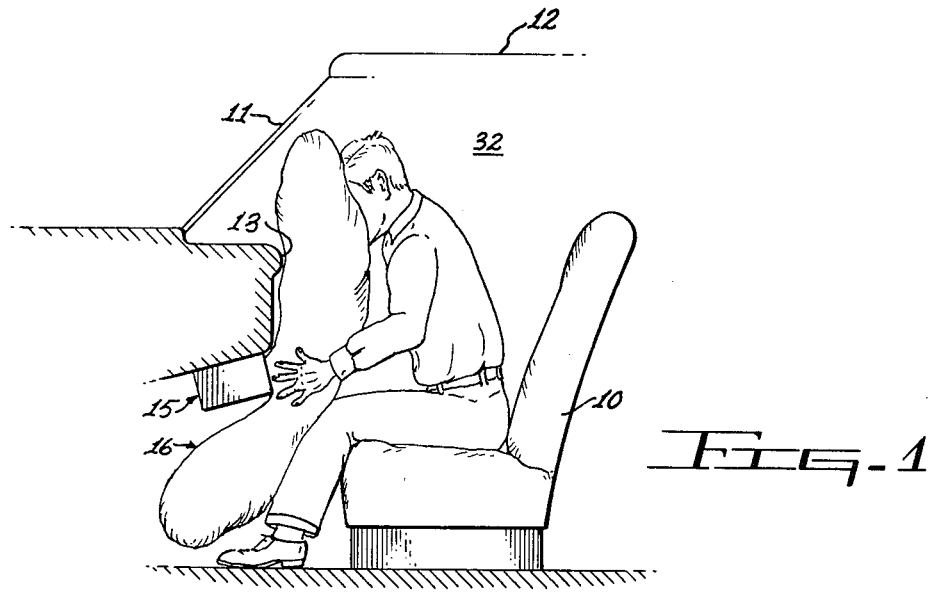
FIG. 1 is a schematic illustration of a portion of a vehicle illustrating the operation of the present collision survival system.

Referring now to FIG. 1, a portion of a vehicle is shown including a seat 10, a windshield 11, a roof 12, and a dashboard 13. In this particular schematic illustration, the apparatus of the present invention is shown at 15 with the inflatable bag 16 extending forward therefrom. The location of the apparatus 15 and the shape, size, and specific location of the bag 16 when inflated are subjects that have extensively been explored in the prior art and need not be discussed here.

Figure 2:
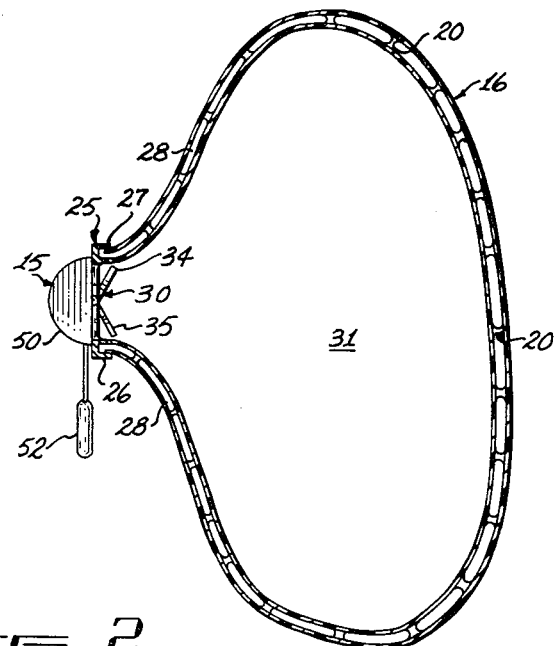
FIG. 2 is a cross-sectional view of the system of the present invention, showing the bag in extended form.
Figure 3:
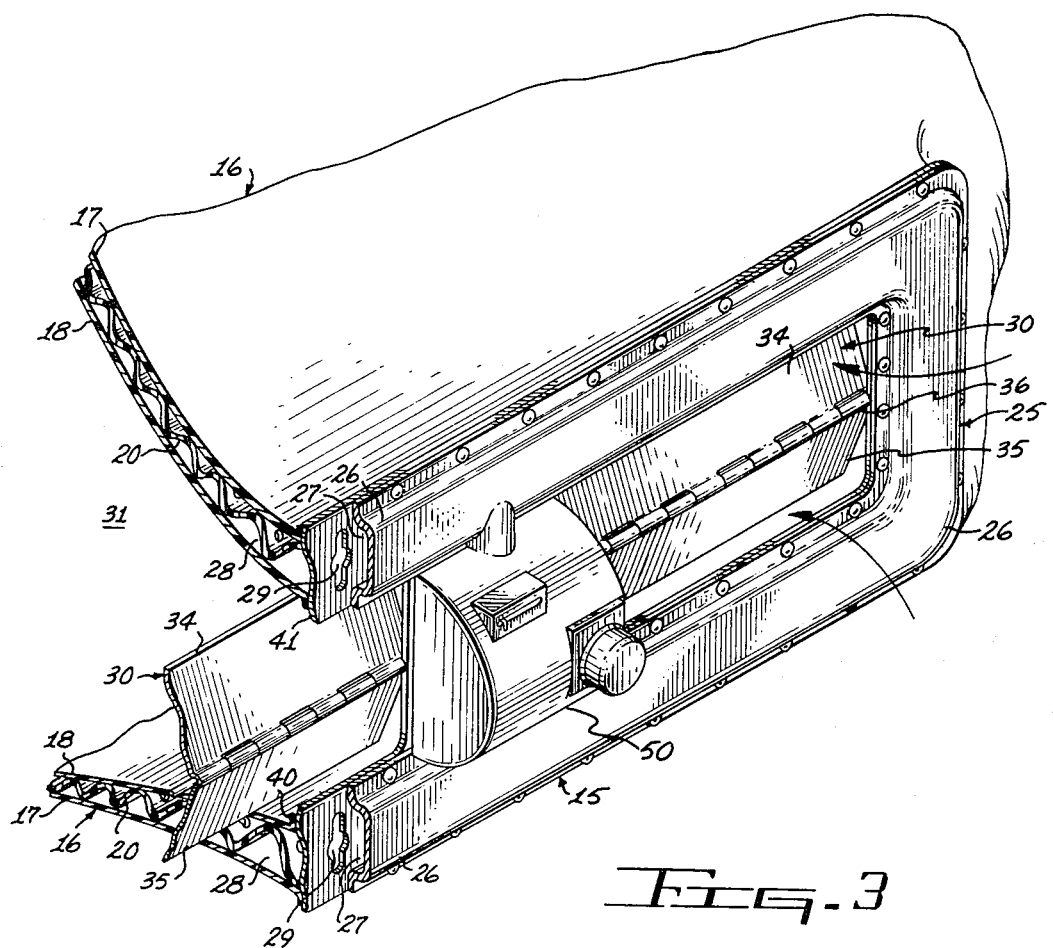
FIG. 3 is a perspective view of a portion of the system of the present invention.

Referring now to FIGS. 2 and 3, the bag 16 includes flexible sheets or skins 17 and 18 that are connected and spaced apart and maintained separated by any convenient or conventional technique, such as by webbing 20. The bag is attached to a manifold 25 formed by a tubular member 26 having a passageway 27 for the admission of gas. The passageway communicates to the passageway 28 formed by the space between the skins 17 and 18 through openings 29 spaced along the passageway 27. In the embodiment chosen for illustration, the manifold is arranged in rectangular form surrounding a unidirectional valve 30. The interior 31 of the bag 16 communicates with the atmosphere 32 (FIG. 1) within the vehicle through the unidirectional valve 30.

The valve may take a variety of forms but, in the embodiment chosen for illustration, vanes 34 and 35 are hinged about a central hinge 36 and are free to open inwardly toward the interior 31 of the bag 16. When the vanes 34 and 35 attempt to swing about the hinge 36 in the opposite direction, they encounter sealing edges 40 and 41 framing the interior of the rectangular opening formed by the manifold 25. The seal between sealing edges 40 and 41 and the respective vanes 34 and 35 may be achieved through the utilization of a rubber gasket or the like.

A sensing means, such as sensor 50, is mounted on the manifold and includes whatever external adjustments may be deemed necessary for the particular application intended for the system of the present invention. The sensor may take the form of conventional acceleration sensing devices to detect vehicular impact. The sensor may also include provision for sensing pitch and roll of the vehicle to enable the system of the present invention to be activated in the event the vehicle assumes an unusual attitude, such as those instances where the vehicle leaves the road and assumes a nose down or other position prior to impact.

A gas source 52 is connected to the manifold 25 through the sensor 50. The gas source may either be a pressure storage system or a gas generating system that may be located at a convenient location but preferably close to the manifold. The gas source 52 may be activated to deliver gas directly to the manifold or may deliver the gas to the manifold through a suitable valving system in the sensor. As previously mentioned, the gas may be stored as compressed air or may be generated by well known chemical gas generating systems; in either case, the gas required to be delivered to the manifold 25 is only that sufficient to inflate the passageway 28 to cause the bag 16 to extend. As the bag 16 extends, the interior 31 thereof assumes a low pressure relative to the atmosphere in the interior 32 of the vehicle. Therefore, air in the vehicle is drawn through the valve 30 into the interior 31 to inflate the bag 16. Since the air from the interior of the vehicle is being utilized to inflate the bag, atmospheric pressure changes are minimized and resistance to the inflation of the bag is greatly reduced.

Figure 4:
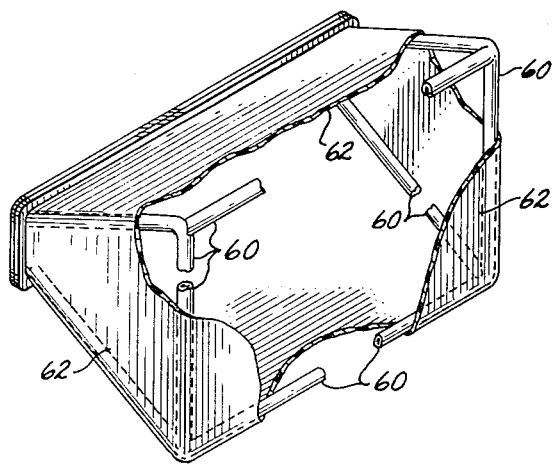
FIG. 4 is a perspective view, partly in section, of an alternative bag construction for use in the system of the present invention.

The passageway 28 between the skins 17 and 18 may be replaced by a different form of bag and passageway, such as the embodiment shown in FIG. 4. In that embodiment, separate tubular passageways 60 form a skeletal structure as they are inflated with the flexible skin 62 of the bag extending therebetween. The embodiment of FIG. 4 may in some respects be more desirable than that of FIGS. 2 and 3 in that the utilization of the discrete tubular passageways 60 enable the designer to more accurately determine the shape of the bag after it is inflated. Other types of passageways may be incorporated in the bag to provide a variety of design effects and to permit alteration of a specific design to fit the requirements of a specific application.

Energization of the gas source may be achieved by connection to the vehicle power supply or may be completely self-contained; however, in the event that the system is self-contained, the present design may be made "failsafe" by providing an interlock with the vehicle ignition such that when the ignition is in the off position, the present system is inactivated and is unenergizable. This latter feature would prevent energization of the present system when the vehicle is empty and unattended even though another vehicle may collide with it.

I claim:

1. A collision survival system for use in a vehicle to restrain persons in said vehicle from colliding with objects within said vehicle, comprising: a gas source; sensing means connected to said gas source responsive to predetermined conditions for activating said gas source; an inflatable bag having an interior communicating with the atmosphere through a unidirectional valve, said bag positioned to intercept the motion of persons in said vehicle and prevent their contact with objects in said vehicle; said unidirectional valve permitting air to enter the interior of said bag and preventing air from exiting said bag interior; said bag including inflatable passageways connected to said gas source to receive gas therefrom when said gas source is actuated; said passageways, when inflated, extending said bag to create low pressure therein and to draw air from the atmosphere through said unidirectional valve to the interior of said bag; said passageways comprising a space between two flexible skins forming said bag.

2. A collision survival system for use in a vehicle to restrain persons in said vehicle from colliding with objects within said vehicle, comprising: a gas source; sensing means connected to said gas source responsive to predetermined conditions for activating said gas source; an inflatable bag in said vehicle having an interior communicating with the atmosphere in said vehicle through a unidirectional valve, said bag positioned to intercept the motion of persons in said vehicle and prevent their contact with objects in said vehicle; said unidirectional valve permitting atmospheric air in said vehicle to enter the interior of said bag and preventing air from exiting said bag interior; said bag including inflatable passageways connected to said gas source to receive gas therefrom when said gas source is actuated; said passageways, when inflated, extending said bag to create low pressure therein and to draw air from the atmosphere in said vehicle through said unidirectional valve to the interior of said bag; said passageways comprising a space between two flexible skins forming said bag.

* * * * *